United States Patent [19]

Li et al.

[11] Patent Number: 5,241,613
[45] Date of Patent: Aug. 31, 1993

[54] OPTICAL FIBER COUPLING/CONNECTOR ELEMENT

[75] Inventors: Ming-Jun Li; Costas Saravanos, both of Saskatoon, Canada

[73] Assignee: Northern Telecom Limited, Montreal, Canada

[21] Appl. No.: 910,929

[22] Filed: Jul. 9, 1992

[30] Foreign Application Priority Data

Jan. 31, 1992 [CA] Canada ............................ 2060424

[51] Int. Cl.⁵ .............................................. G02B 6/26
[52] U.S. Cl. .......................................... 385/78; 385/55; 385/56; 385/80; 385/95; 385/98; 385/29
[58] Field of Search ................ 385/126, 127, 128, 73, 385/97, 98, 77, 78–80, 99, 95, 29, 35, 36

[56] References Cited

U.S. PATENT DOCUMENTS

| | | | |
|---|---|---|---|
| 4,185,883 | 1/1980 | Chown et al. | 385/78 X |
| 4,212,514 | 7/1980 | Prunier et al. | 385/29 X |
| 4,290,667 | 9/1981 | Chown | 385/33 X |
| 4,290,668 | 9/1981 | Ellis et al. | 385/128 X |
| 4,398,796 | 8/1983 | Dalgoutte et al. | 385/78 X |
| 4,553,814 | 11/1985 | Bahl et al. | 385/78 X |
| 4,598,974 | 7/1986 | Munn et al. | 385/78 X |
| 4,723,828 | 2/1988 | Garel-Jones et al. | 385/29 X |
| 4,743,086 | 5/1988 | Hicks, Jr. | 385/29 X |
| 4,763,976 | 8/1988 | Nolan et al. | 385/127 X |
| 4,877,303 | 10/1989 | Caldwell et al. | 385/55 X |
| 4,877,306 | 10/1989 | Kar | 385/126 X |
| 4,964,688 | 10/1990 | Caldwell et al. | 385/56 X |
| 5,044,724 | 9/1991 | Glodis et al. | 385/127 |
| 5,048,917 | 9/1991 | Komatsu | 385/78 |
| 5,168,536 | 12/1992 | Kucherov et al. | 385/78 |

*Primary Examiner*—Brian Healy
*Attorney, Agent, or Firm*—C. W. Junkin

[57] ABSTRACT

An optical fiber connector element comprises a ferrule and an optical fiber stub secured within a through passage of the ferrule. The optical fiber stub comprises a core, an inner cladding having a diameter no more than six times the core diameter and a refractive index less than the core refractive index, and an outer cladding having a refractive index greater than the inner cladding refractive index and less than or equal to the ferrule refractive index. A length of the outer cladding is in intimate contact with the ferrule. A rearward part of the ferrule passage may have an inner diameter greater than the outer diameter of the fiber stub, and a plastic plug having a through passage for receiving the fiber stub may be located in the rearward part of the ferrule passage. The plastic plug has a refractive index equal to or greater than the outer cladding refractive index and less than the ferrule refractive index. The optical fiber connector element provides the convenience of a stub connector while reducing modal interference effects.

12 Claims, 3 Drawing Sheets

OPTICAL FIBER COUPLING/CONNECTOR ELEMENT

FIELD OF THE INVENTION

This invention relates generally to optical coupling elements, and more particularly to optical coupling elements used in optical fiber connectors, patch cords and the like.

BACKGROUND OF THE INVENTION

Single-mode optical fibers used in telecommunications applications at operating wavelengths near 1310 nm can carry higher order modes in addition to the fundamental mode they are intended to carry. Optical power coupled into these higher order modes at an input end of a fiber are strongly attenuated and are not observed at an output end of the fiber if the fiber is more than a few meters long. However, optical power from both the fundamental mode and higher order modes can be observed at the output end of a fiber shorter than about one meter.

When a short piece of single-mode fiber is connected between a launching fiber and a receiving fiber, most of the optical power of the fundamental mode of the launching fiber is coupled into the fundamental mode of the short fiber. However, some of the optical power of the fundamental mode of the launching fiber is coupled into higher order modes of the short fiber. The fundamental and higher order modes propagate along the short fiber with different propagation delays and reach the junction of the short fiber and the receiving fiber out of phase. Most of the optical power of the fundamental mode of the short fiber is coupled into the fundamental mode of the receiving fiber. Some of the optical power of the higher order modes of the short fiber is also coupled into the fundamental mode of the receiving fiber at the junction of the short fiber and the receiving fiber, where it interferes with optical power coupled from the fundamental mode of the short fiber. The propagation delay difference of the fundamental and higher order modes varies with wavelength, so the optical power of the fundamental mode of the receiving fiber is strongly wavelength dependent. This phenomenon is known as modal interference.

It is generally more convenient to mount an optical fiber pigtail or stub to a connector ferrule or optoelectronic device under ideal factory conditions and to splice that stub to a transmission fiber under less ideal field conditions than it is to mount the transmission fiber directly in the connector ferrule under the less ideal field conditions. However, in this case the optical fiber pigtail or stub is a potential source of modal interference, and the connector insertion loss can be strongly wavelength dependent and therefore practically unpredictable. Short optical fibers may also be found in optical fiber telecommunications systems as patch cords and as pigtails for optoelectronic devices, and these too are potential sources of undesirable modal interference effects, including modal noise.

Optical fiber systems designers have dealt with modal interference problems by using optical fiber having a relatively low cut-off wavelength for pigtails and patch cords. Even so, relatively long lengths of such fiber may be needed to provide the required attenuation of higher order modes, and such lengths must frequently be stored as optical fiber loops.

U.S. Pat. No. 4,877,306 proposes a special fiber design for control of modal noise in short fiber sections. According to this design, an outer cladding layer is selectively doped with FeO, CdO, $MO_3$, $Cr_2O_3$, $V_2O_5$, CoO, $Nb_2O_5$ or $TiO_2$ to provide a high refractive index and a high attenuation. This outer cladding layer effectively traps and attenuates high order modes in a few tenths of a meter. This patent specifically teaches away from the use of optical fiber coatings having a higher refractive index than the optical fiber claddings. (U.S. Pat. No. 4,877,306 was issued in the name of Gitimoy Kar on Oct. 31, 1989 and is entitled "Coated Optical Waveguide Fibers".)

SUMMARY OF THE INVENTION

This invention provides a novel optical coupling element for use in optical fiber connectors and the like. The novel optical coupling element obviates or mitigates modal interference problems as discussed above.

One aspect of the invention provides an optical coupling element comprising a length of optical fiber and a fiber surround. The optical fiber comprises a core, an inner cladding and an outer cladding. The core has a core diameter and a core refractive index. The inner cladding has an inner cladding outer diameter no more than six times the core diameter and an inner cladding refractive index less than the core refractive index. The outer cladding has an outer cladding refractive index greater than the inner cladding refractive index. The fiber surround is in intimate contact with the outer cladding of the optical fiber and has a surround refractive index equal to or greater than the outer cladding refractive index.

The core of the fiber may be undoped silica glass or silica glass doped with an index-raising dopant such as germanium. The inner cladding may be silica glass doped with an index-lowering dopant such as fluorine, and the outer cladding may be undoped silica glass. The fiber surround may be a zirconia ferrule, a plastic ferrule-insert, a mass of epoxy or a combination of these.

Another aspect of the invention provides an optical fiber connector element. The connector element comprises a ferrule and an optical fiber stub secured within a through passage of the ferrule. The optical fiber stub comprises a core, an inner cladding and an outer cladding, a length of which is in intimate contact with the ferrule. The core has a core diameter and a core refractive index. The inner cladding has an inner cladding outer diameter no more than six times the core diameter and an inner cladding refractive index less than the core refractive index. The outer cladding has an outer cladding refractive index greater than the inner cladding refractive index. The ferrule has a ferrule refractive index equal to or greater than the outer cladding refractive index.

A rearward part of the ferrule passage may have an inner diameter greater than the outer diameter of the fiber stub, and the connector element may further comprise an index-matching material which is located in the rearward part of the ferrule passage in intimate contact with the fiber stub. The index-matching material, which may be a plastic plug having a through passage for receiving the fiber stub, has a refractive index equal to or greater than the outer cladding refractive index and less than the ferrule refractive index.

BRIEF DESCRIPTION OF THE DRAWINGS

Embodiments of the invention are described below by way of example only. Reference is made to accompanying drawings, in which.

DESCRIPTION OF EMBODIMENTS

Figure 1:
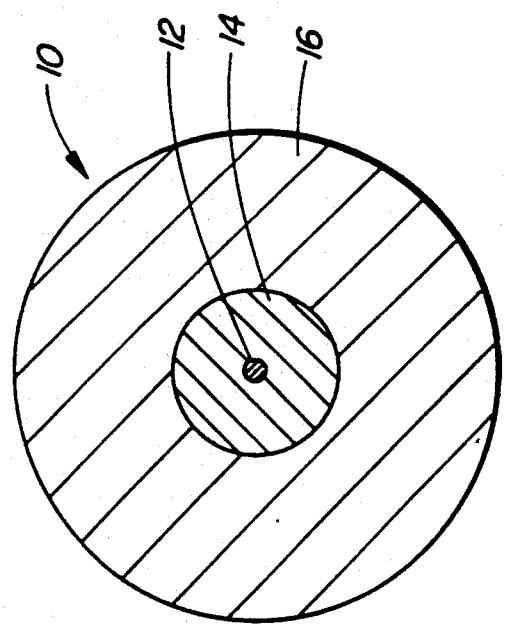
FIG. 1 is a cross-sectional view of an optical fiber stub used in an embodiment of the invention.

FIG. 1 is a cross-sectional view of an optical fiber stub 10 especially designed for use in a connector element 100 according to an embodiment of the invention. The optical fiber stub 10 comprises a core 12 of undoped silica glass, an inner cladding 14 of fluorine-doped silica glass and an outer cladding 16 of undoped silica glass. The core diameter is 7,7 microns, the outer diameter of the inner cladding is 42.4 microns and the outer diameter of the outer cladding is 125 microns. The stub 10 is approximately 15 mm long.

Figure 2:
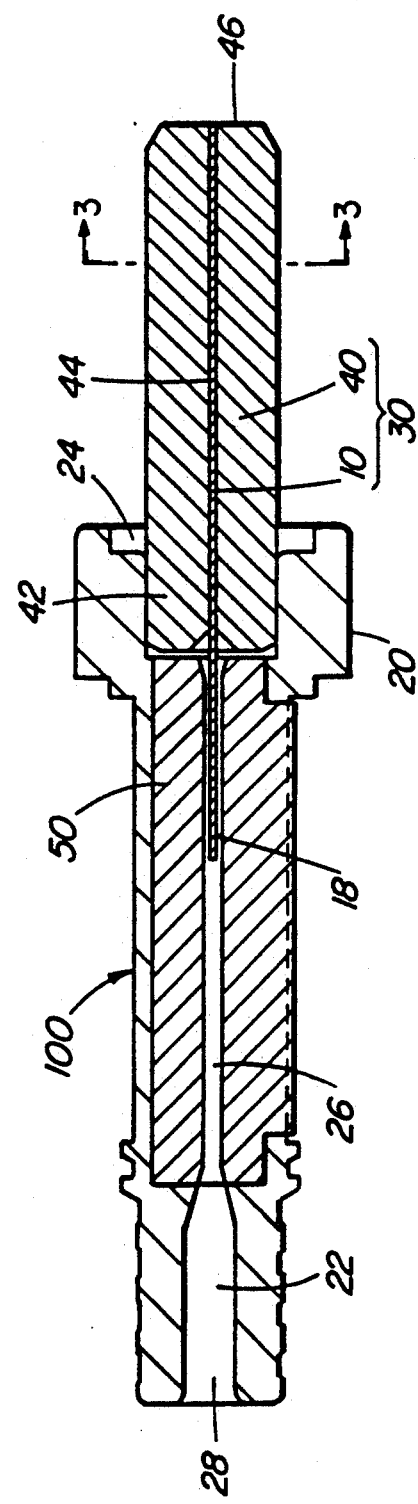
FIG. 2 is a cross-sectional view of a connector element according to a first embodiment of the invention, the connector element including the optical fiber stub of FIG. 1.

FIG. 2 is a cross-sectional view of the connector element 100 according to the first embodiment. The connector element 100 comprises a housing 20 having a through passage 22 and an optical coupling element 30 carried in the passage 22 of the housing 20.

The optical coupling element 30 comprises the optical fiber stub 10 described above with reference to FIG. 1 and a precision zirconia ferrule 40 approximately 10 mm long. A rearward end 42 of the ferrule 40 is received and retained in a forward portion 24 of the passage 22 of the housing 20. The optical fiber stub 10 is secured with a thin layer of epoxy in a through passage 44 of the ferrule 40 and polished flush with a forward end surface 46 of the ferrule 40. A part 18 of the optical fiber stub 10 extends rearward from the passage 44 of the ferrule 40 into a cavity 26 of the housing 20 located rearward of the forward portion 24 of the passage 22.

The cavity 26 receives and retains a clamp-type mechanical splice 50 similar to that disclosed in U.S. Pat. No. 5,029,972, which is hereby incorporated by reference. (U.S. Pat. No. 5,029,972 issued Jul. 9, 1991 in the name of Lukas et al and is entitled Optical Fiber Mechanical Splice and Method for its Use.) The mechanical splice 50 is used to splice a transmission fiber inserted into a rearward portion 28 of the passage 22 of the housing 20 to the rearward part 18 of the optical fiber stub 10.

Figure 3:
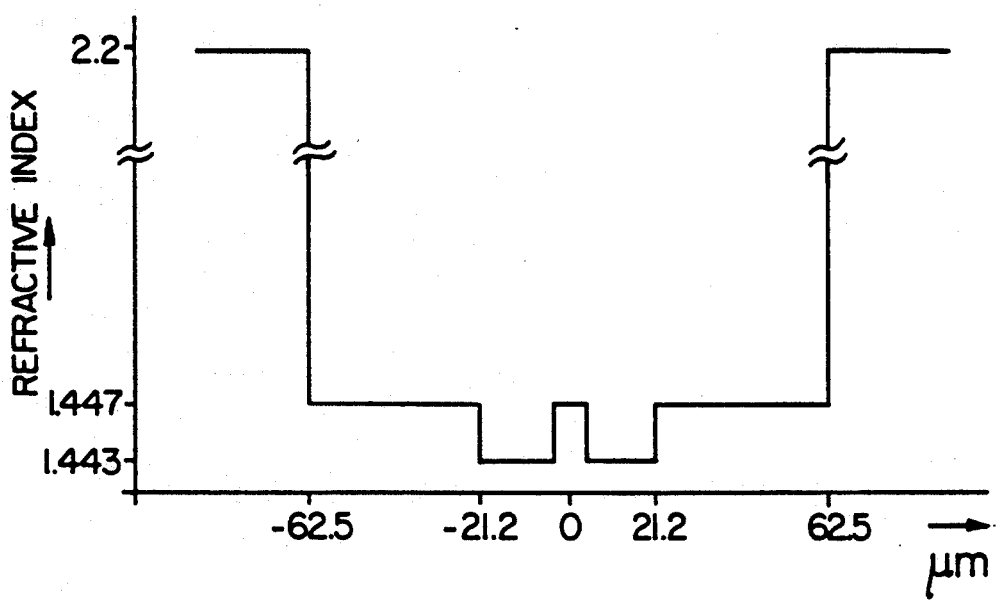
FIG. 3 is a refractive index profile for an optical coupling element of the connector elements of FIG. 2.

FIG. 3 is a refractive index profile for the optical coupling element taken on the line 3—3 in FIG. 2. The optical fiber core 12 is undoped silica glass having a refractive index of 1.447 at 1310 nm. The inner cladding 14 is silica glass doped with fluorine to provide a depressed refractive index of 1.443 at 1310 nm. The outer cladding 18 is undoped silica glass and has a refractive index of 1.447 at 1310 nm. The zirconia ferrule has a refractive index of 2.2 at 1310 nm. The layer of epoxy used to secure the fiber stub 10 in the passage 22 of the ferrule 20 is so thin that the ferrule 20 performs optically as a fiber surround in intimate contact with the outer cladding 18. The refractive index of the epoxy is generally between that of the zirconia ferrule 20 and the undoped outer cladding 18.

The refractive index profile of the optical coupling element 30 is such as to reduce the efficiency of coupling from the fundamental mode of a standard single mode telecommunications fiber into higher order modes of the stub 10 and to reduce the efficiency of coupling from such higher order modes of the stub 10 to the fundamental mode of a standard telecommunications fiber. Moreover, the refractive index profile encourages leakage of such higher order modes into the ferrule 20, further reducing the optical power coupled from higher order modes of the stub 10 into the fundamental mode of a standard telecommunications fiber connected to the stub 10.

Figure 4:
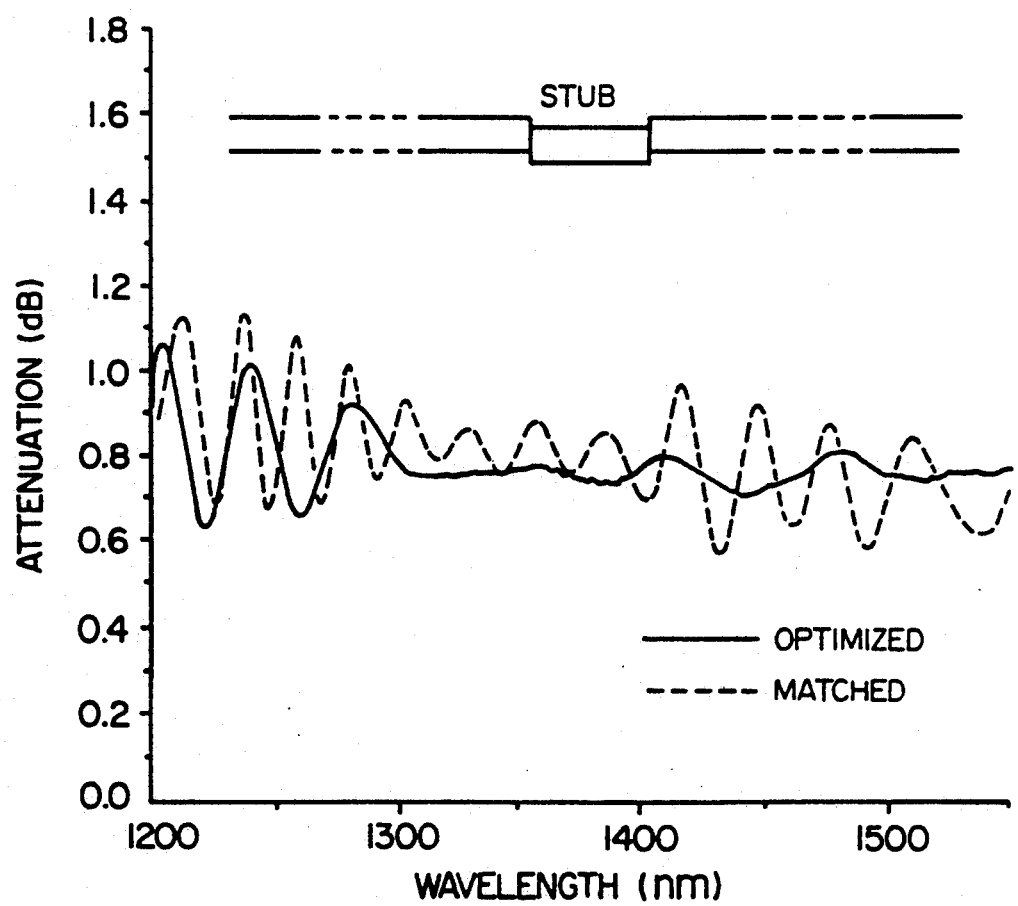
FIG. 4 is a plot of attenuation versus operating wavelength for the coupling element of FIG. 3 connected between two standard telecommunications fibers (solid line) and for a stub of standard telecommunications fiber connected between two standard telecommunications fibers (dotted line)

FIG. 4 is a plot of attenuation versus operating wavelength for the coupling element 30 connected between two standard telecommunications fibers (solid line), and for a 15 mm stub of standard telecommunications fiber connected between two standard telecommunications fibers (dotted line) with an equivalent offset-induced loss. This plot demonstrates that the coupling element 30 substantially reduces attenuation variations due to modal interference for operating wavelengths between 1300 nm and 1500 nm.

Figure 5:
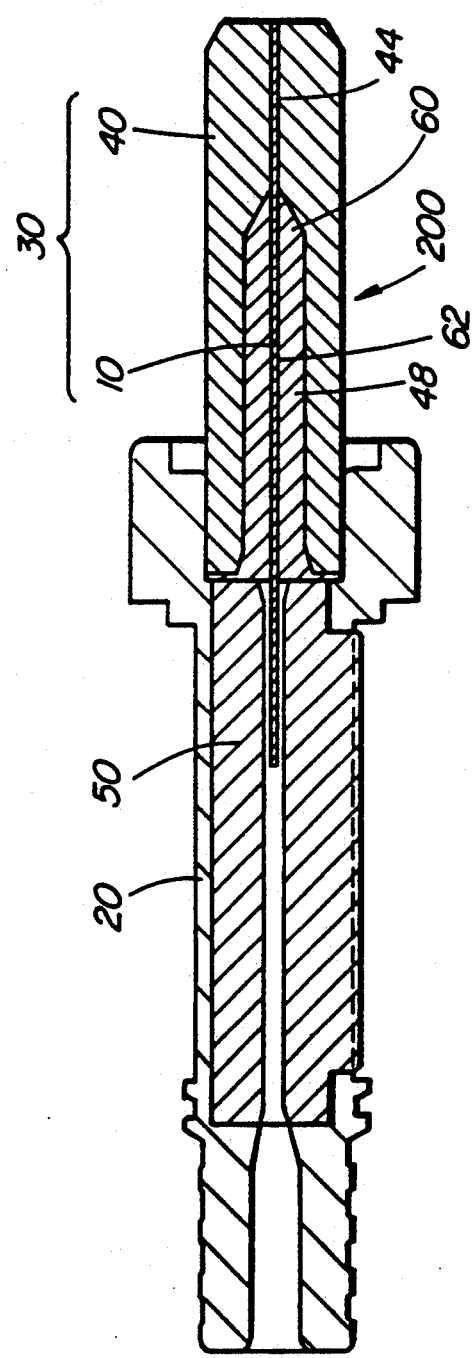
FIG. 5 is a cross-sectional view of a connector element according to a second embodiment of the invention.

FIG. 5 is a cross-sectional view of a connector element 200 according to a second embodiment of the invention. The connector element 200 is similar to the connector element 100 except that a rearward part 48 of the passage 44 through the ferrule 40 has an inner diameter greater than the outer diameter of the fiber stub 10, and the fiber surround further comprises a plug 60 of index-matching plastic located in the rearward part 48 of the passage 44. The plug 60 has a through passage 62 for receiving the stub 10 which is secured in the passage 62 with a thin layer of epoxy. The layer of epoxy is thin enough that the plug 60 performs optically as a fiber surround in intimate contact with the outer cladding 18. The refractive index of the plug 60 is approximately 1.6, and the refractive index of the epoxy is slightly higher than the refractive index of the undoped outer cladding 18.

Further modifications may be made without departing from the invention. For example, the fiber surround may be any material of suitable refractive index, such as a thick layer of epoxy injected so as to fill the rearward part 48 of the passage 44 of the ferrule 40. The core 12 of the stub 10 may be doped with germanium or other index-raising dopant to provide an elevated refractive index. The inner cladding 14 may be doped with an index-lowering dopant other than fluorine, and may have an outer diameter between 4.5 and 6 times the core diameter. The outer cladding may have an outer diameter between 110 microns and 150 microns. The refractive indices may also vary, though preferably the core refractive index minus the inner cladding refractive index is between 0.0035 and 0.0045, and the surround refractive index minus the outer cladding refractive index is between 0 and 0.8. These and other variations are within the scope of the invention as claimed below.

The optical fiber stub 10 may be made by any suitable optical fiber manufacturing process. Such manufacturing processes include Inside Vapour Deposition (IVD) by Modified Chemical Vapour Deposition (MCVD) or Plasma Enhanced Chemical Vapour Deposition (PECVD), Outside Vapour Deposition (OVD) by flame hydrolysis, Vapour Axial Deposition (VAD) by flame hydrolysis, and hybrids of these techniques. Each of these processes is known to skilled practitioners of the fiber manufacturing art.

We claim:

1. An optical coupling element comprising: a length of optical fiber, the optical fiber comprising:
    a core having a core diameter and a core refractive index;
    an inner cladding having an inner cladding outer diameter no more than six times the core diameter and an inner cladding refractive index, the core refractive index minus the inner cladding refractive index being between 0.0035 and 0.0045; and
        an outer cladding having an outer cladding refractive index greater than the inner cladding refractive index; and
    a fiber surround in intimate contact with the outer cladding of the optical fiber, the fiber surround having a surround refractive index, the surround refractive index minus the outer cladding refractive index being between 0 and 0.8.

2. An optical coupling element as defined in claim 1, wherein the fiber surround is selected from the group consisting of zirconia, plastic, and epoxy.

3. An optical coupling element as defined in claim 1, wherein:
    the core refractive index at 1310 nm is 1.447;
    the inner cladding refractive index at 1310 nm is 1.443;
    the outer cladding refractive index at 1310 nm is 1.447; and
    the fiber surround refractive index at 1310 nm is 2.2.

4. An optical coupling element as defined in claim 1, wherein:
    the core refractive index at 1310 nm is 1.447;
    the inner cladding refractive index at 1310 nm is 1.443;
    the outer cladding refractive index at 1310 nm is 1.447; and
    the fiber surround refractive index at 1310 nm is 1.6.

5. An optical coupling element as defined in claim 1, wherein the inner cladding has an outer diameter between 4.5 times the core diameter and 6 times the core diameter.

6. An optical coupling element as defined in claim 5, wherein the outer cladding has an outer diameter between 110 microns and 150 microns.

7. An optical coupling element as defined in claim 3, wherein:
    the core diameter is substantially equal to 7.7 microns;
    the inner cladding outer diameter is substantially equal to 42 microns; and
    the outer cladding outer diameter is substantially equal to 125 microns.

8. An optical coupling element as defined in claim 4, wherein:
    the core diameter is 7.7 microns;
    the inner cladding outer diameter is 42 microns; and
    the outer cladding outer diameter is 125 microns.

9. An optical fiber connector element, comprising:
    a ferrule having a passage therethrough and a ferrule refractive index;
    an optical fiber stub secured within the passage of the ferrule, the optical fiber stub having a diameter less than a lateral dimension of at least a part of the passage and comprising:
        a core having a core diameter and a core refractive index;
        an inner cladding having an inner cladding outer diameter no more than six times the core diameter and an inner cladding refractive index less than the core refractive index; and
        an outer cladding having an outer cladding refractive index greater than the inner cladding refractive index and less than or equal to the ferrule refractive index; and
    an index matching material extending along said part of the passage in intimate contact with a length of the outer cladding of the optical fiber stub for stripping higher order modes propagating in the optical fiber stub, the index matching material having a refractive index equal to or greater than the outer cladding refractive index and less than the ferrule refractive index.

10. An optical fiber connector element as defined in claim 1, further comprising a housing having a through passage, the passage of the housing having a forward portion for receiving and retaining a rearward end of the ferrule, the housing having a cavity located rearward of the forward portion of the passage, part of the optical fiber stub extending rearward from the passage of the ferrule into the cavity for splicing to an optical fiber inserted into the passage of the housing from a rearward end of the housing.

11. An optical fiber connector element as defined in claim 10, further comprising a mechanical splice received and retained within the cavity of the housing.

12. An optical fiber connector element as defined in claim 9, wherein the index matching material is a plastic plug having a through passage for receiving the optical fiber stub.

* * * * *